(12) United States Patent
Ortiz et al.

(10) Patent No.: US 8,362,635 B2
(45) Date of Patent: Jan. 29, 2013

(54) WIND-DRIVEN ELECTRIC POWER GENERATION SYSTEM ADAPTED FOR MOUNTING ALONG THE SIDE OF VERTICAL, MAN-MADE STRUCTURES SUCH AS LARGE BUILDINGS

(75) Inventors: Luis M. Ortiz, Albuquerque, NM (US); Anthony Michael Baca, Albuquerque, NM (US); Donald Wichers, Albuquerque, NM (US)

(73) Assignee: MDL Enterprises, LLC, Albuquerque, NM (US)

( * ) Notice: Subject to any disclaimer, the term of this patent is extended or adjusted under 35 U.S.C. 154(b) by 592 days.

(21) Appl. No.: 12/632,699

(22) Filed: Dec. 7, 2009

(65) Prior Publication Data
US 2010/0230973 A1    Sep. 16, 2010

Related U.S. Application Data

(63) Continuation-in-part of application No. 12/058,764, filed on Mar. 31, 2008, now Pat. No. 7,868,476, which is a continuation-in-part of application No. 12/127,508, filed on May 27, 2008, now Pat. No. 8,067,852.

(60) Provisional application No. 60/921,331, filed on Mar. 31, 2007, provisional application No. 60/953,206, filed on Jul. 31, 2007.

(51) Int. Cl.
*F03D 9/00* (2006.01)

(52) U.S. Cl. ............................................. 290/55; 290/44

(58) Field of Classification Search ............ 290/43, 290/44, 54, 55; 415/4.5
See application file for complete search history.

(56) References Cited

U.S. PATENT DOCUMENTS

| | | | |
|---|---|---|---|
| 4,176,283 A | 11/1979 | McLaren | |
| 6,409,466 B1 * | 6/2002 | Lamont | 415/3.1 |
| 7,147,428 B2 * | 12/2006 | Lamont | 415/1 |
| 7,258,523 B2 * | 8/2007 | Williams | 415/2.1 |
| 7,868,476 B2 * | 1/2011 | Baca et al. | 290/55 |
| 8,067,852 B2 * | 11/2011 | Ortiz et al. | 290/55 |
| 8,143,737 B2 * | 3/2012 | Ortiz et al. | 290/54 |
| 2005/0104379 A1 | 5/2005 | Haskill | |
| 2008/0224475 A1 | 9/2008 | Mellor et al. | |
| 2008/0272603 A1 | 11/2008 | Baca et al. | |
| 2011/0285134 A1 * | 11/2011 | Ortiz et al. | 290/52 |

FOREIGN PATENT DOCUMENTS

WO    WO 2009/110020 A2    9/2009

OTHER PUBLICATIONS

PCT International Search Report for PCT/US2010/059163 dated Aug. 22, 2011.

* cited by examiner

*Primary Examiner* — Nicholas Ponomarenko
(74) *Attorney, Agent, or Firm* — Luis M Ortiz

(57) ABSTRACT

A updraft wind powered electrical generator system mountable to sides of a vertical, man-made structures facing prevailing winds. The updraft system includes a tubular housing that can include at least one fixed helical vane formed onto the inner surfaces of the tubular housing in a spiral and adapted to direct wind into a spiraled flow and focus fluid onto a fan blade assembly associated with an alternator system and located within the tubular housing before a system exhaust. A generator cone can be mounted near the center and front of the fan blade assembly facing wind passing through the tubular housing. As wind passes over the generator cone it experiences compression between the generator cone and housing resulting in increased pressure and velocity of the fluid, thereby increasing rotational speed of the generator blades and generator as the compressed, spiraled fluid passes through the blades and exits the tubular housing.

16 Claims, 12 Drawing Sheets

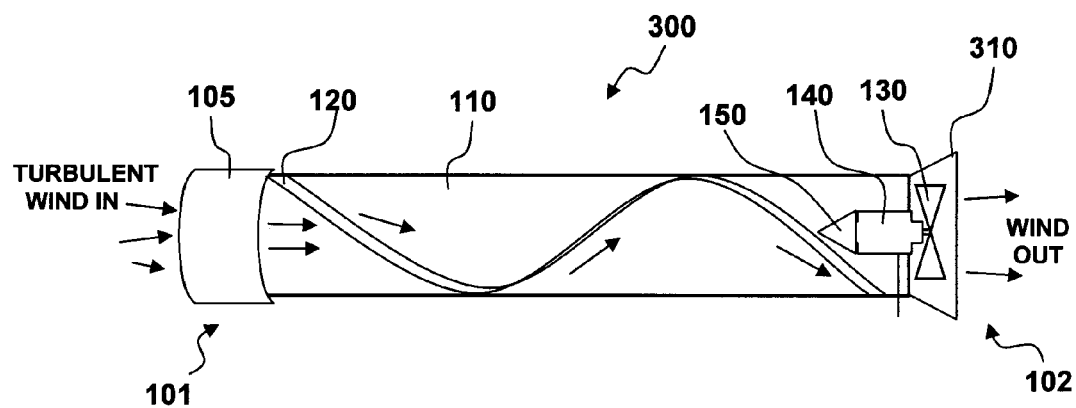
FIG. 8
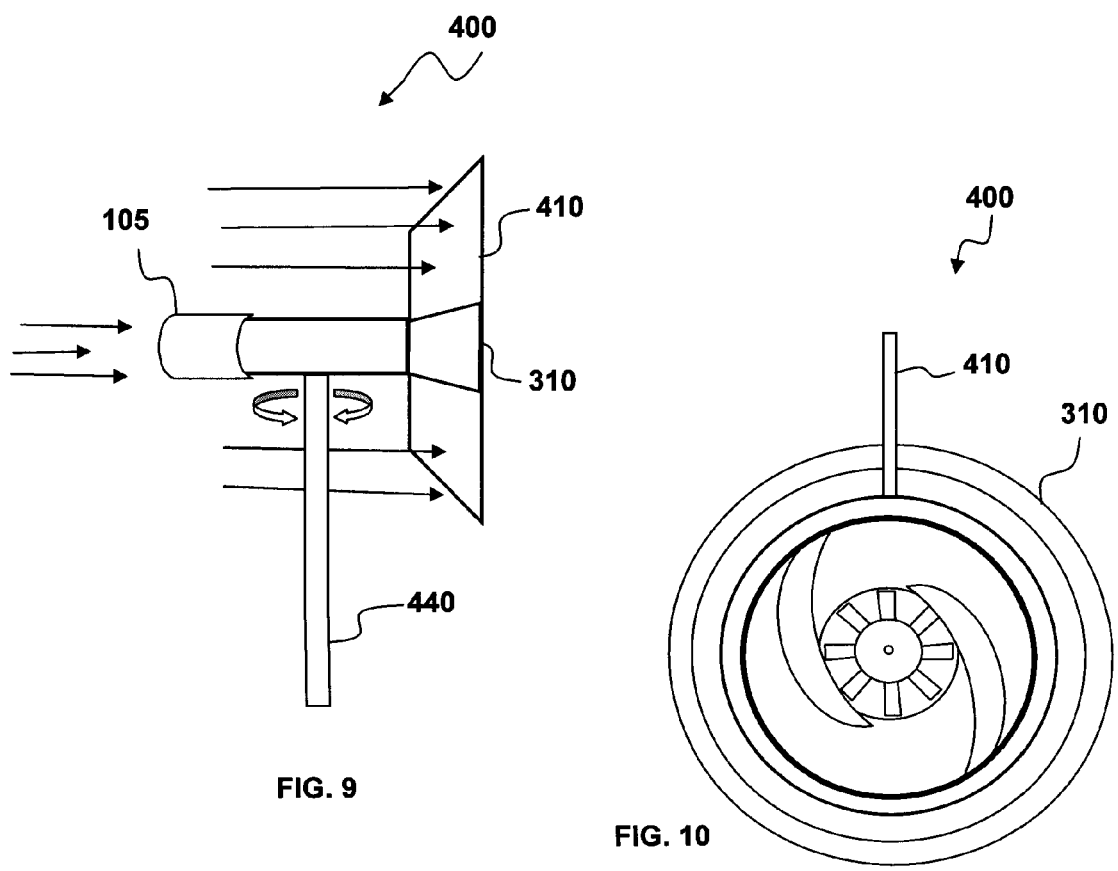
FIG. 9
FIG. 10

WIND-DRIVEN ELECTRIC POWER GENERATION SYSTEM ADAPTED FOR MOUNTING ALONG THE SIDE OF VERTICAL, MAN-MADE STRUCTURES SUCH AS LARGE BUILDINGS

RELATED APPLICATIONS INCORPORATED BY REFERENCE

This patent application is related to and claims priority as a continuation-in-part patent application to Ser. No. 12/058,764, filed Mar. 31, 2008, entitled "WIND-DRIVEN ELECTRIC POWER GENERATION SYSTEM", which also claims priority as a continuation to provisional patent application 60/921,331, filed Mar. 31, 2007 and to Ser. No. 12/127,508, filed May 27, 2008, entitled "Fluid Driven Electrical Power Generation System", which also claims priority to provisional patent application 60/953,206, filed Jul. 31, 2007, all herein incorporated by reference herein.

TECHNICAL FIELD

The present invention is generally related to renewable energy systems. More particularly, the present invention is related to wind powered electrical generation systems adapted for fixed electrical power generation systems and side of building mountable applications.

BACKGROUND OF THE INVENTION

Wind is a force of nature that surrounds large buildings and structures and is rarely being tapped for its energy generating potential. Wind is harnessed to sail ships, pump water, and create electricity, just to name a few applications.

Recent events in the world have highlighted the need for alternative, cleaner methods of power production, whether it is from the wind, the sun, water, or organic matter. Changes in battery storage capacity and life and generator efficiency have created a situation where individuals desiring to supplement their energy requirements may do so at a much more affordable cost over 15 years ago. These so-called "Green" technologies continue to be improved as energy shortages and high costs of energy plague society.

In general, electric power generation systems can be classified into hydroelectric power generation, thermal power generation, nuclear power generation, solar power generation, bio-fuel power generation and wind power generation using wind energy. Wind energy is limitless, purely domestic renewable energy that is freely available in the world. The wind power generation system faces some difficulty in its stability due to fluctuation in direction and speed of air. Recently, many new ideas and theories for windmill and wind power generation have surfaced, like the use of propeller shaped blades as part of large, scaled power generators that rotate based on aerodynamics of the blade designs.

Wind generated power has been used as a source of electricity that can be used directly by buildings and other fixed infrastructure, or has been fed directly into public utility system grids for distribution and use by public utility customers. Wind generated electrical power will continue to find uses as its need increases at all levels and types of consumption and as an alternative energy to fossil fuels.

It is known in the art that the propeller of a wind power generator should ideally be positioned in the path of the flowing air. In most systems currently being deployed internationally, propellers and generators can reach height greater than 100 feet and rotational diameters greater than 100 ft. Propellers currently used with wind power generators are designed in such a way to produce power output as various wind speed conditions press against propeller blades. It is unfortunate that such systems must be so large, which is a main point of contention by many communities and makes deployment of large-scaled electric wind generators on the top of large buildings infeasible.

New systems for the generation of electrical power from natural sources are clearly needed that are smaller than is currently available and in wide use. There is also more specifically a need for smaller, less visually intrusive wind powered electric generation systems for fixed residential and commercial applications. With the current invention a system is presented that can less expensively generate electrical energy from prevailing wind flow. Power generated by the present invention can be utilized in fixed, building-side mounted applications and can generate electrical power from wind for use for storage, to power resident systems, and to feed into power grids.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an objective of the present invention to provide an improved wind (also referred to herein as "fluid") powered electric power generating system. Fluid flow as used herein includes power harnessed from airflow caused by prevailing winds.

It is another objective of the present invention to provide a wind driven electric power generator system useful for static, building mounted applications. Static applications can include side-mounted commercial and industrial building applications.

In accordance with a feature of the present invention, a system generating electrical power from fluid can include a cowling located at a first end of a tubular housing to capture fluid and can direct it into the tubular housing.

In accordance with yet another feature of the present invention, at least one fixed helical vane can be integrated into the inner surface of the tubular housing in a spiral, adapted to further direct fluid captured in the housing into a spiraled fluid flow and more directly focus the fluid's energy onto fan blades associated with an electrical alternator located at or near the end of the at least one fixed helical vane. A second end of the tubular housing can enable fluid to be exhausted from the tubular housing once it has passed through fan blades associated with the electrical alternator.

In accordance with another feature of the present invention, a cowling can be located at the front of the housing before the alternator/fan with its point facing incoming fluid to cause the fluid to flow directly onto fan blades and not encounter a flat surface typically associated with the back of a alternator or center portion of a fan wherefrom blades extend. Pressure caused between the inner surface of the housing tubing and the cone/generator can force fluid directly onto the alternator fan blades and outward past the fan blades where the fluid can be exhausted from the second end of the housing.

In accordance with another feature of the present invention, a cone can be mounted at the center and front of the alternator within the circumference of the fan blades, facing approaching fluid passing through the tubular housing. As fluid passes over the generator cone it can experience compression between the generator cone and housing resulting in increased pressure and velocity of the fluid as it passes through the fan blades, thereby increasing rotational speed of the fan blades and alternator as the compressed air passes through the blades.

In accordance with another feature application of the present invention, the system can be rotatably mounted on top of a pole for fixed residential used, remote telecommunications equipment power, power grid distribution, or fixed commercial applications. Mounting of the unit to poles, towers, rooftops, beams and other fixed hardware can be facilitated with bearing and mounts that can withstand extreme fluctuations and high stress.

In accordance with another feature of the present invention, electrical contact discs (plates) can be provided that facilitate electrical connections between the generator and external modules (e.g., batteries, converters, etc.) and prevent wire tangling. Sealed electrical contact discs can be integrated with the bearing and mounting mechanism adapted to rotatably mount the housing to a pole.

In accordance with another feature of the present invention, a fin can be provided in fixed attachment to a second end of the power generating system near the second end of the tubular housing to direct the front of the tubular housing into approaching fluid by rotating the housing on a pole, thereby enabling the system to receive the maximum amount of available wind into the system.

In accordance with another feature of the present invention, power conditioning can be provided to generated power if necessary using conditioning circuits known in the art (e.g., filtering circuits). The size of the present system is scalable to meet delivery requirements.

In accordance with another feature of the present invention, the housing can be made of a tough light weight metal or a composite that will be able to withstand harsh environments while meeting the highest of standards.

In accordance with another feature of the present invention, a conical flange can be formed at the second end of the unit, said conical flange adapted to protect the can blades and also enables fluid to escape from the unit without interruption from exterior wind source moving along the sides of the unit. The conical flange can also assist in the orientation of the first end of the system in the directions of incoming fluid.

In accordance with another feature of the present invention, a cupped fan blade can be included to enhance the effect of fluid pressure on the fan blades and ultimately as rotation of the alternator.

In accordance with another feature of the present invention, a clutching mechanism and/or mechanical breakaway can be provided to accommodate conditions where the wind speed exceeds rotational capabilities of the alternator and/or power output requirements/thresholds. Clutching can be provided in the form of a fan blade assembly designed with materials that can flex above threshold rotational speeds (RPMs) in order to prevent operation of the generator above damage causing thresholds, design parameters and generator capacity limits.

In accordance with another feature of the present invention, an electronic starting circuit can be provided in order to facilitate initial starting of a traditional alternator from periods when the alternator is idle (e.g., no rotation due to lack of fluid). The electronic starting system can provide an initial release of electrical energy to the windings in the generator to thereby reduce the amount of fluid required to spin-up/start rotation of the generator.

A new generator/alternator that can be used in the present invention includes a generally radial shape and includes a winding portion integrated on/within a tubular housing adapted to carry fluid there through, and an integrated fan rotor portion rotationally operable within the electromagnetic field of a fixed winding portion associated with a tubular housing. The winding portion can include coil windings formed from flat conductor material and emplaced around a core of magnetic flux conducting material. The integrated fan rotor portion includes permanent magnets attached to a rim formed on the outer circumference of fan blades extending from a center rotor. Rotation of the magnets disposed on the outer perimeter of the fan blades as fluid passes through the tubular housing and the fan blades of the integrated fan rotor portion produces magnetic fields on the winding portion that remains stationary because the winding portion is integrated with the tubular housing.

Another benefit of the alternator of this embodiment is with its potentially low manufacturing cost. The conductor coils can be located on or integrated within the tubular housing peripherally to a magnetic field emitting rotor upon final assembly. The manufacturing reproducibility of the design of the radial, slotless alternator is therefore less expensive and more practical for enable fluid flow there through in accordance with the present invention. Although the radial, slotless alternator can be incorporated into working embodiments of the present invention, other alternator designs can still operate well within fluid power generating systems described herein without limitation.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 8 illustrates a side view of fluid driven electrical power generating system including a conical flange located near the second end of the system with fluid directing the cowling located at the first end of the tubular housing into oncoming fluid flow, in accordance with features of the present invention;

FIG. 9 illustrates a side view of an air driven electrical power generating system rotationally mounted on a pole and including a fin to oriented the front end of the power generating system into oncoming wind, in accordance with features of the present invention;

FIG. 10 illustrates a view of the first end of the fluid driven electrical power generating system such as that shown in FIG. 9, similar looking to the generator with a cowling shown in FIG. 7 but including a fin and conical flange located near the second end of the system, in accordance with features of the present invention;

DETAILED DESCRIPTION

The particular values and configurations discussed in these non-limiting examples can be varied and are cited merely to illustrate at least one embodiment and are not intended to limit the scope thereof.

"Fan" or "fan blade" are commonly used in association with wind or airflow but as referred to herein should also be interpreted to include the meaning associated with "propeller" or "propeller blades" which are terms commonly used when referring to water flow as a fluid medium.

"Alternator" as used herein should also be interpreted to include "generator" as a means for producing electrical energy.

"Fluid" when and as used herein should be interpreted to include wind, airflow caused by prevailing winds forced against the sides of buildings, and updraft air flow or updraft wind caused by prevailing wind pushing against the sides of buildings.

Figure 1:
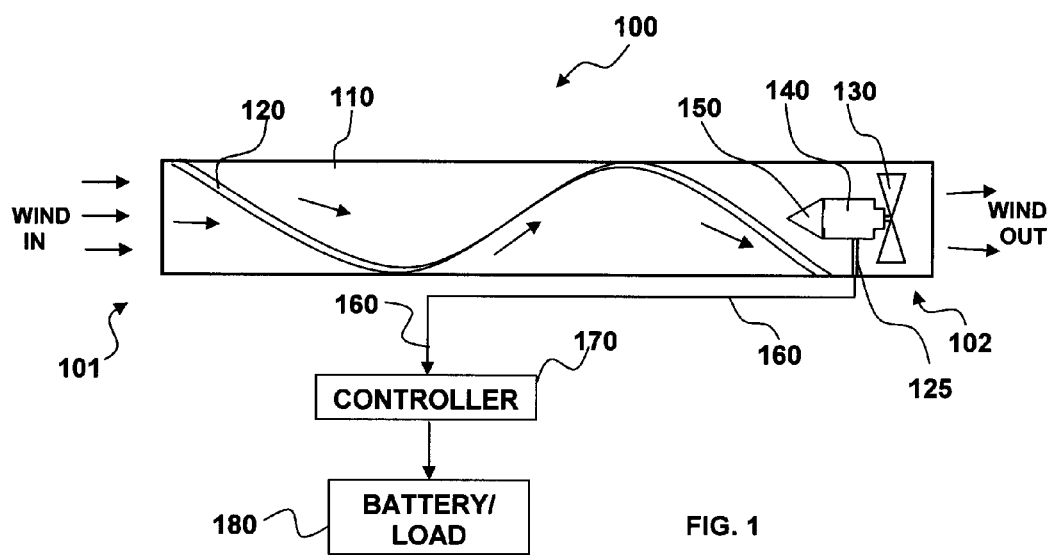
FIG. 1 illustrates a block diagram of a fluid driven electrical power generating system, which can be implemented in accordance with features of the present invention.

FIG. 1 illustrates a block diagram of a wind driven electrical power generating system 100, which can be implemented in accordance with a preferred embodiment. The system 100 can include a tubular housing 110 having a first end 101 and a second end 102 including at least one helical vane 120 formed therein which can cause fluid entering the first end 101 and flowing through the tubular housing to spiral as it approaches a integrated fan rotor assembly 130 mechanically or electromagnetically connected to an electric alternator 140 located near the second end 102, wherein electrical power can be generated as the fan 130 turns the electric alternator 140. A cone 150 can also be provided in front of the fan 130 and/or electrical alternator 140. The cone 150 can be place in front of the generator 140 if the generator is placed before and is connected to the fan 130, or the cone 150 can be placed before the flat center portion of the fan 130, which are the central structural areas that are generally known to generally support fan blades extending there from. It can be appreciated that the alternator 140 and any electrical wiring 160 associated therewith can be protected within the tubular housing 110 when main components the alternator can be placed before the fan. The electrical power from the electrical generator 140 can be routed via electrical connection 160 for immediate use by a load 180 (e.g., storage and later use in/from batteries, transfer to electric power grids, direct use by electric components) or can first pass through a controller 170 for power management.

Fixed helices 120 can be formed on surfaces of a tubular housing 110 and within the tubular housing 110 as depicted in FIG. 1. A fixed helix 120 can increase fluid flow as well as creating a spiral laminar air flow, thus avoiding turbulent air flow. Enhanced spiraled flow causes efficient spinning of fan blades 130 at an accelerated speed, thereby increasing rotational speed of a generator 140 installed within the system 100 for optimal power output with minimal velocity or fluid speed conditions external to the system. Fixed helical vanes 120 are ideally designed to achieve the direction of incoming fluid into a spiraled air flow. Fixed helices 120 within the enclosure tube can increase fluid flow as well as creating a spiraled air flow. In application where a cowling is used at the intake, the cowling can create a laminar fluid flow prior to a spiraling effect placed on fluid by the helical vanes 120. Based on enclosure shape and design, the helical vanes 120 can conform to a concave inner surface of the tubular housing 110 enclosure inner surface while insuring the optimal three-dimensional helix angles. The vanes 120 can direct and increase the spiral rotation and velocity of the fluid, thus more efficiently spinning the fan blade 130 thereby increasing rotational efficiency of any generator used therein for optimal power output.

Figure 2:
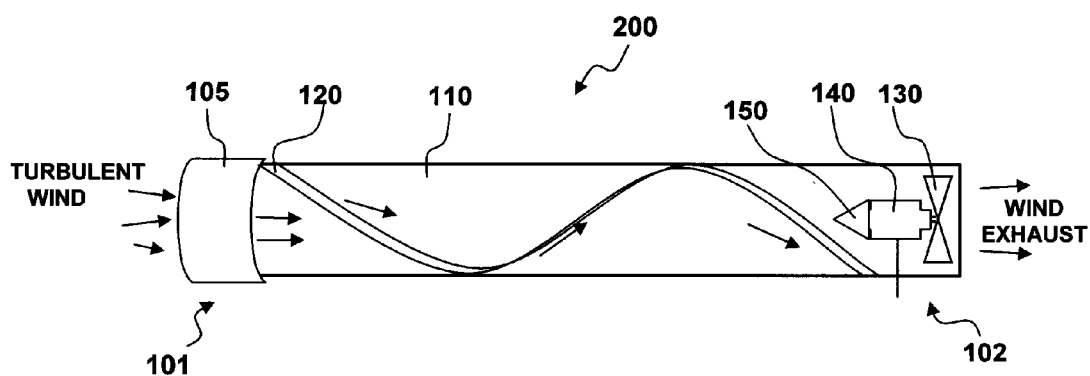
FIG. 2 illustrates a block diagram of a fluid driven electrical power generating system including a cowling used with turbulent incoming fluid, which can be implemented in accordance with features of the present invention.

Referring to FIG. 2, illustrated is a block diagram of a fluid driven electrical power generating system 200 such as that generally shown in FIG. 1, can include a cowling 105 located at the first end 101 of the tubular housing 110 for some applications wherein fluid (i.e., wind or ocean current must be captured and managed. The cowling 105 enables the receipt of fluid into the tubular housing 110 and the straightening of fluid into laminar flow as it passes the cowling 105 and enters the tubular housing 110. The cowling 105 is effective in capturing fluid and taming turbulent fluid flow, which is typically encountered with wind and ocean current.

Figure 3:
FIG. 3 illustrates a turbulent flow of air flowing through a tubular housing without a cowling.

FIG. 3 illustrates a turbulent flow 330 of wind inside a clear passage tube. Air flow occurs only when there is a difference between pressures. Air will generally flow from a region of high pressure to one of low pressure. Typically, the bigger the presser difference, the faster the flow. When air flows at higher velocities, especially through an airway with irregular walls, flow is generally disorganized, even chaotic, and tends to form eddies. A relatively large driving pressure is typically required to sustain turbulent flow. Driving pressure during turbulent flow is believed proportional to the square of the flow rate such that to double the flow rate one must quadruple the driving pressure, which is touched on by the following equation:

Turbulent flow can be described by Poiseuille's Law:
$\Delta P = KV^2$

Where
ΔP=Driving force,
K=Constant,
V=Air flow.

Figure 4:
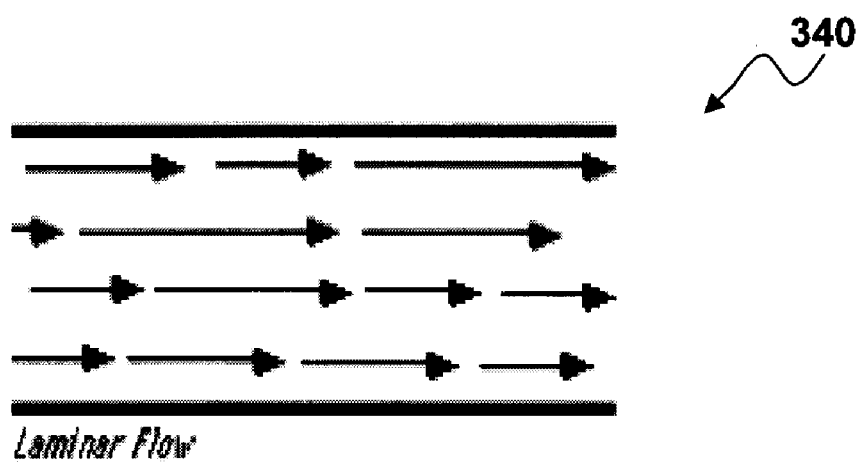
FIG. 4 a laminar flow of air flowing through a tubular housing of wind driven electrical power generating system using a cowling to capture wind and direct it into the housing, which can be implemented in accordance with a preferred embodiment.

FIG. 4 illustrates a laminar flow 340 of a wind inside passage tube. When flow is of a relatively low velocity and passes through narrow tubes, it tends to be more orderly and streamlined and can flow in a straighter path. This type of flow is called laminar flow. Unlike turbulent flow, laminar flow is directly proportional to the driving pressure, such that to double the flow rate, one needs only double the driving pressure, as generally shown by the following equation:

Laminar flow can be described by Poiseuille's Law
$$\Delta P = V(8\eta l/\pi r^4)$$

Where ΔP=Difference in pressure between two points,
V=Air flow,
R=Radius of passage tube,
η=Gas Velocity, and
l=length of the tube.

Figure 5:
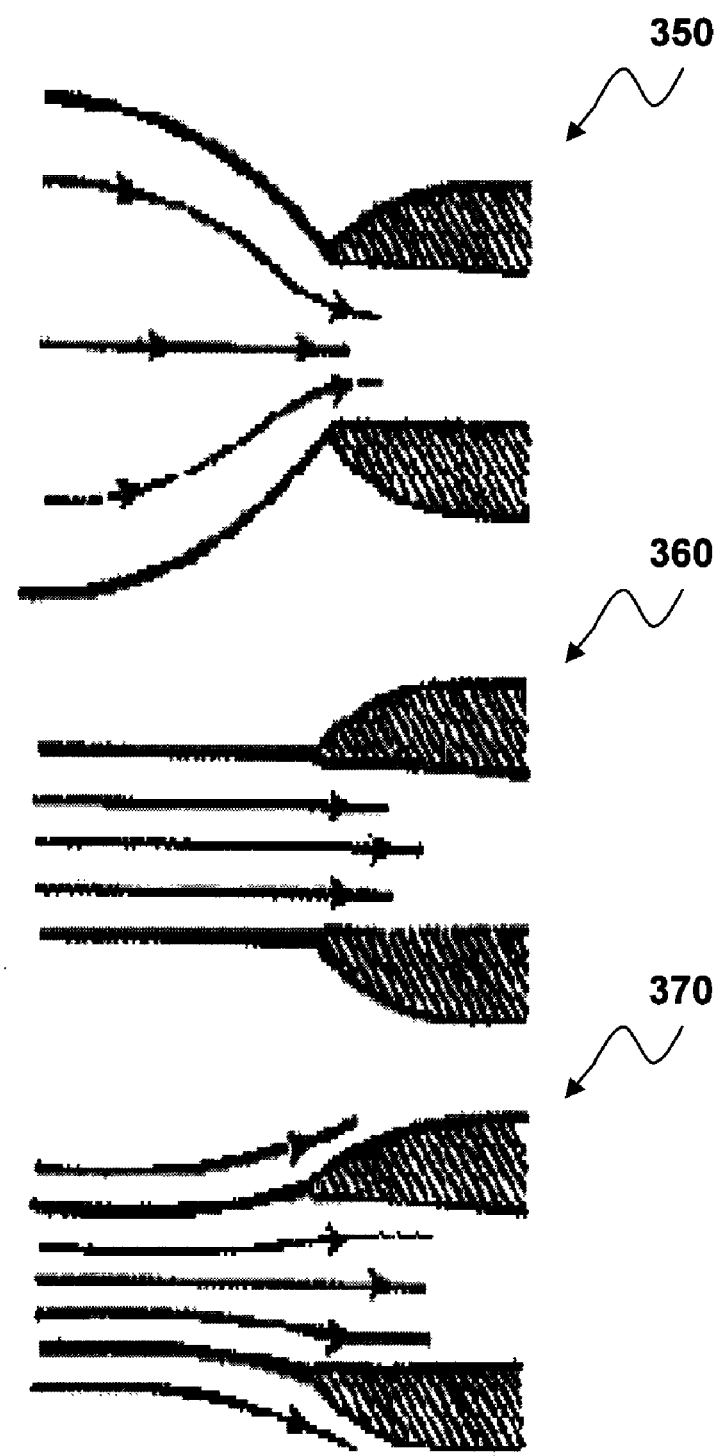
FIG. 5 illustrates three phenomena that can occur with wind directed toward a cowling. a cowling design of a wind driven electrical power generating system, which can be implemented in accordance with a preferred embodiment.

It has become important in the field of fluid dynamics to control turbulent flow and enable the efficient capture of a fluid. FIG. 5 illustrates a cowling design 350, 360, 370, and various airflow phenomena. The design of the conical inlet (a tube with an aerodynamic fairing around it) or conical air intake in the shape of a cowling as illustrated helps to direct air into housing. When used in the present invention, the inlet is ideally design to draw in as much wind coming toward it as possible to cause favorable power generation by the system 100 as depicted in FIG. 2, especially when used in combination with at least one fixed helical vane 120 as depicted in FIG. 2 and fan blade assembly 130 as depicted in FIG. 2.

Figure 6:
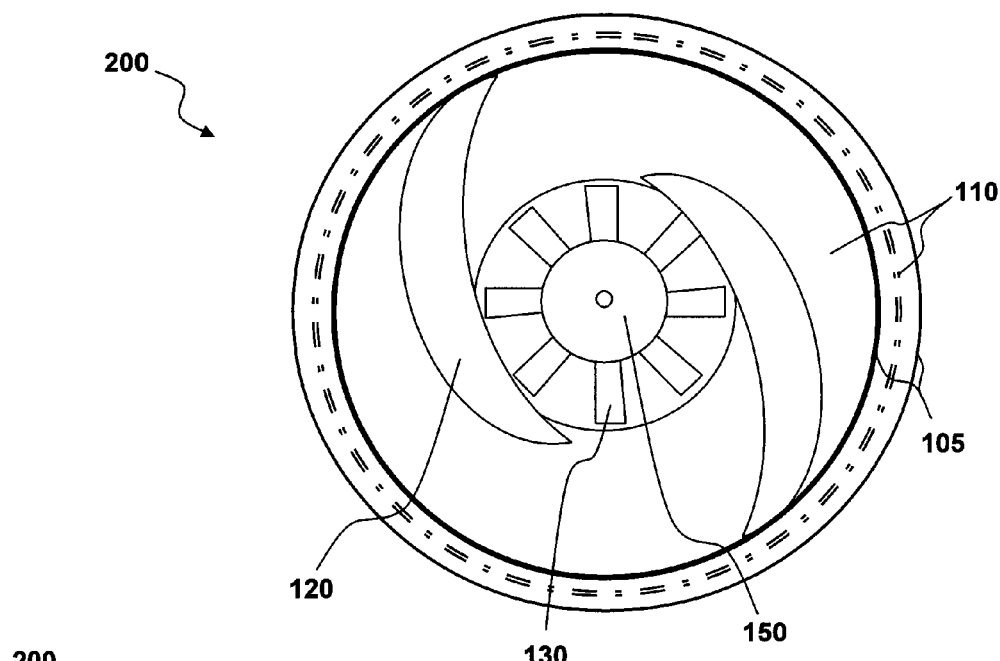
FIG. 6 illustrates a view of the first end of the fluid driven electrical power generating system looking into the cowling or coupling (depending if application is using a cowling with turbulent fluid or a coupling spliced into a water distribution system) through the inside of the tubular housing past helical vanes towards the fan, in accordance with features of the present invention.

Referring to FIG. 6, a view from the first end of the fluid driven electrical power generating system 200 looking into the housing shown outlined 110 past a cowling 105 (or coupling, depending if application is using a cowling with turbulent fluid or a coupling spliced into a water distribution system). Inside of the tubular housing 110 are helical vanes 120 fixed on the inner surface of the housing 110 and spiraling towards a fan 130 and cone 150, in accordance with features of the present invention.

Figure 7:
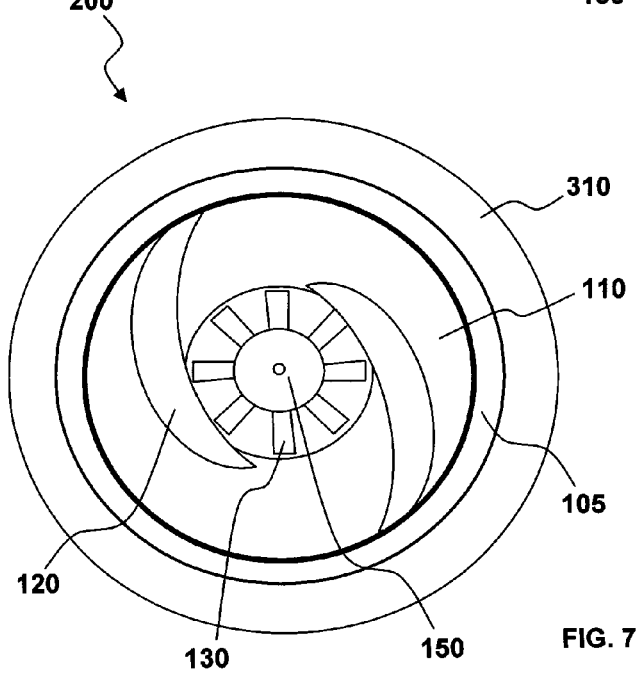
FIG. 7 illustrates a view of the first end of the fluid driven electrical power generating system such as that shown in FIG. 6, including a cowling/coupling located at the first end of the system, in accordance with features of the present invention.

FIG. 7 illustrates another view of a fluid driven electrical power generating system 300 from the first end of the system, in accordance with features of the present invention. The system 300 includes a cowling 105 located at the first end and also an exhaust 310 located at the second end of the system. The exhaust 310 can be provided in the form of a conical flange.

Referring to FIG. 8, a side view of an exhaust 310 can be designed at a wider, tapered outward diameter than the air passage tubing 110 in order to allow air flowing through the air passage to easily escape the system around cone 150 and generator 140, thus also aiding in the removal of heat produced in/by the generator during the production of electrical power.

Referring to FIG. 9, a side views of a wind power electric generation system 400 is illustrated. The wind power electric generation system 400 includes a cowling 105 at the intake, a conical flange shaped exhaust 310, and a fin 410 used to orient the front of the system 400, and cowling 105, into approaching wind. The wind power electric generation system can be rotatable mounted onto a pole 400, which can be provided at various lengths depending on the systems application and surrounding environmental conditions.

FIG. 10 illustrates a side view of a wind driven electrical power generating system 400 in FIG. 9 from the first end of the system. In accordance with features of the present invention, the system 400 includes a fine 410 for orienting the system into oncoming wind. Also shown is the exhaust 310 which can be provided in the form of a conical flange.

Figure 11:
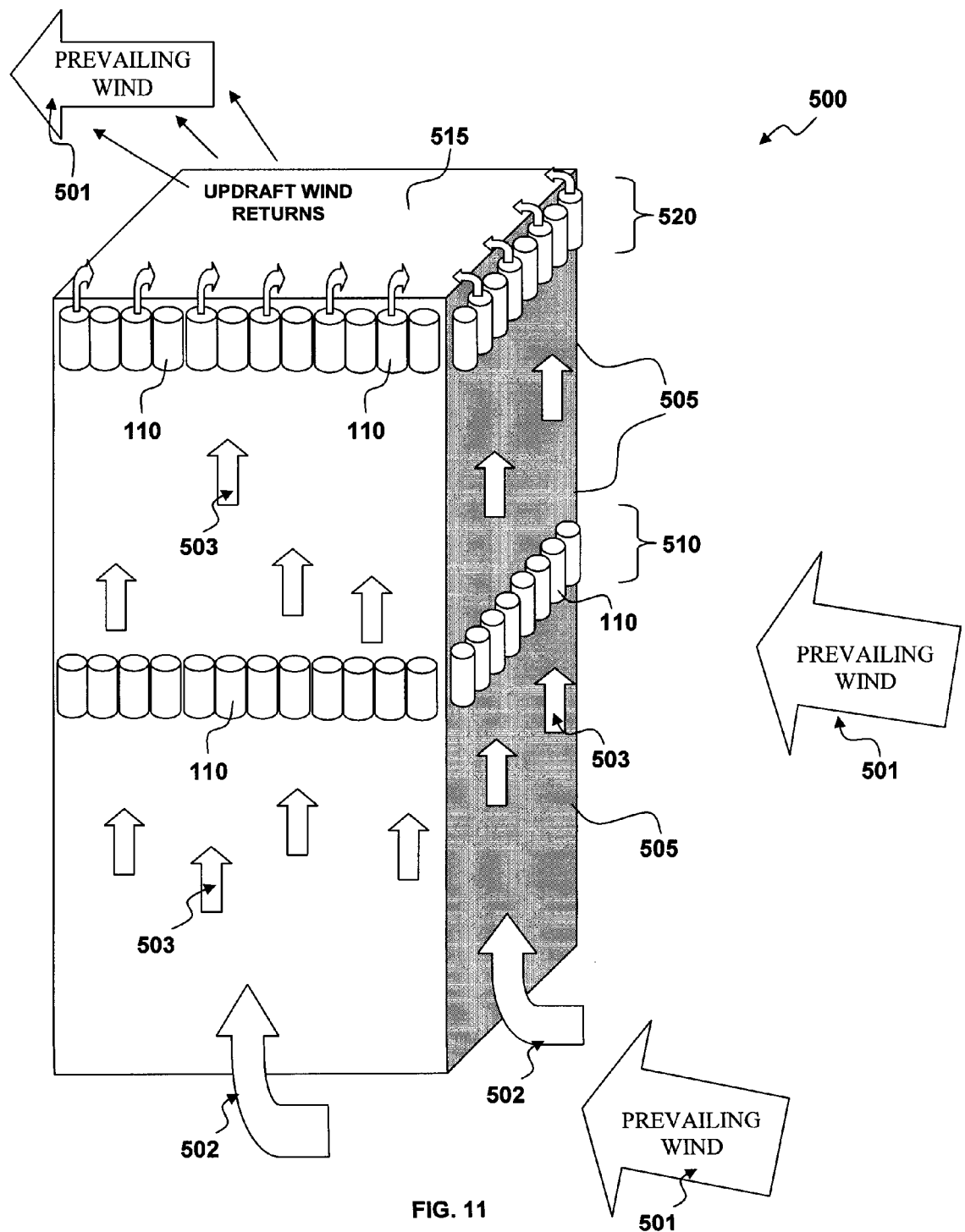
FIG. 11 is an illustration of wind driven electrical power generating systems mounted on the side of a large building, which can be implemented in accordance with features of the present invention.

FIG. 11 illustrates a perspective view of a tall building 500 showing two sides 505 and a rooftop 515. Several wind powered electrical generations systems 110 are shown mounted along the sides of the building 510. The wind powered electrical generations systems 110 can be oriented to capture updraft wind 502 caused by prevailing winds 501 pushing against the sides of the building at locations near its middle 510 and updraft wind flowing upward towards units mounted near the rooftop 515.

Figure 12:
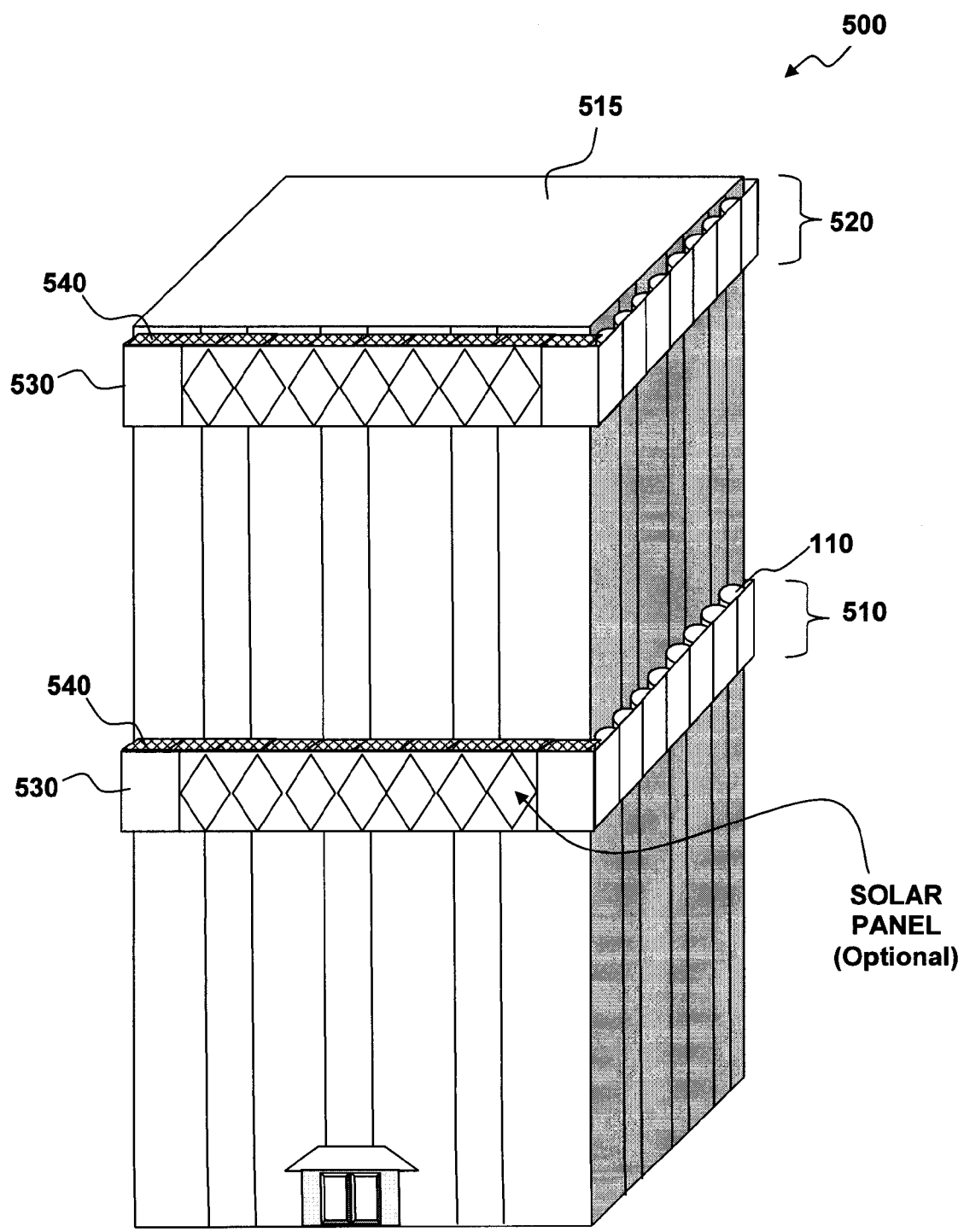
FIG. 12 is an illustration of wind driven electrical power generating systems mounted on the side of a large building including protecting, decorative covers and screens, which can be implemented in accordance with features of the present invention.

FIG. 12 illustrates another perspective view of the tall building 500 showing two sides 505 and a rooftop 515. The updraft wind powered electrical generation systems 110 mounted along the sides of the building, whether they are mounted near the building's middle 510, top 520 or other side locations, and are shown covered by decorative, protective panels 530. To the extent that one side of the building or structure is facing the sun during the day, the decorative, protective panels can also be provided in the form of active solar panels. Active solar panels can provide additional power to a control system including electric power from the wind-powered electric generators. Screens 540, or the like (e.g., net, mesh), can be mounted at the entry and exit areas of the updraft wind powered electrical generation systems 110 in order to prevent birds and debris from damaging the systems. The updraft wind powered electrical generations systems 110 are still oriented to capture updraft wind 502 caused by prevailing winds 501 pushing against the sides of the building 510 and flowing upward towards the rooftop 515. The decorative panels will be more acceptable to municipalities and its citizenry and provide protection below from failing units. Larger system proposed by those in the art would be exposed and could pose safety issues if mounted at rooftops.

Figure 13:
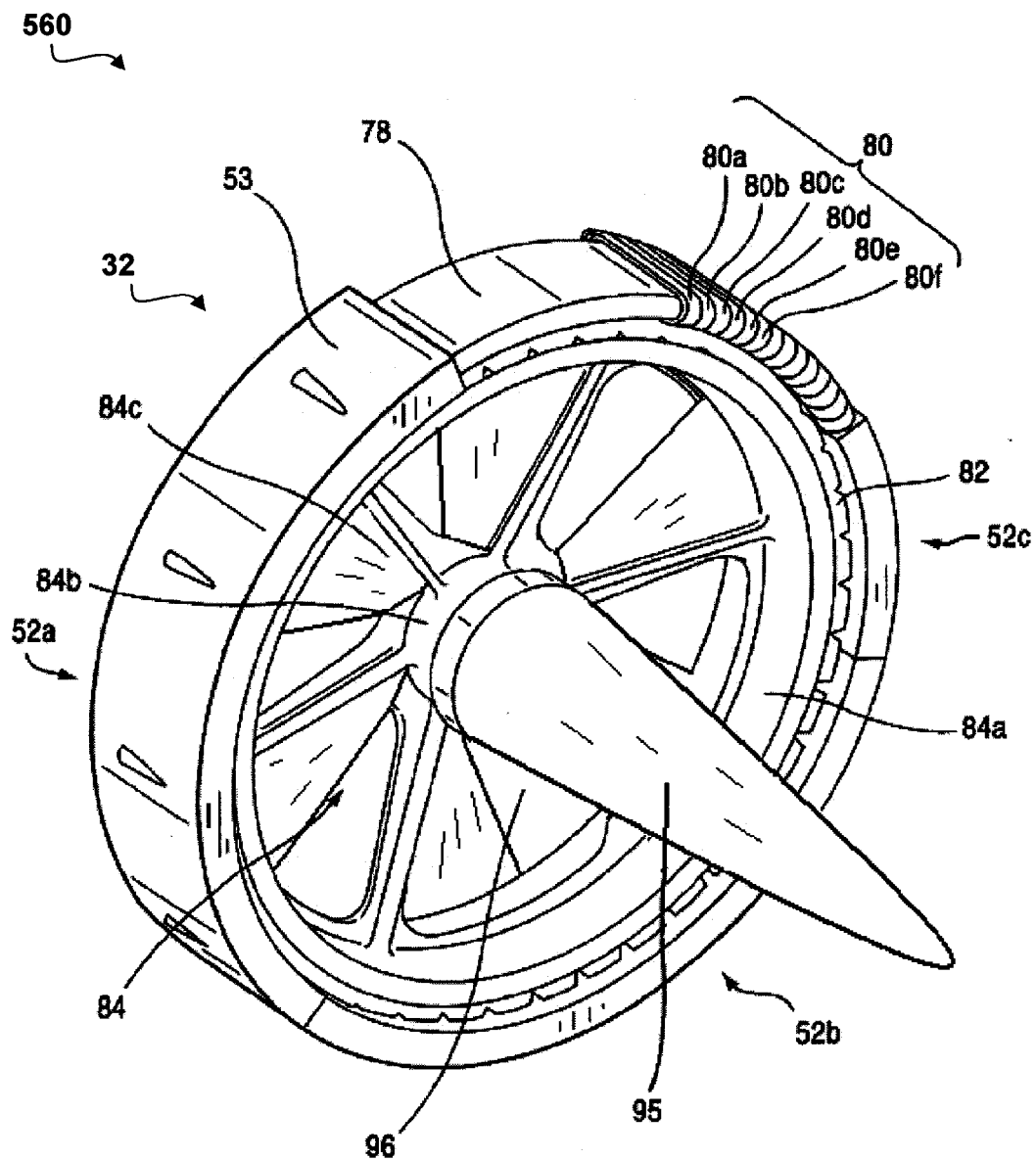
FIGS. 13-15 is a perspective view of a slotless integrated fan alternator wherein the outer circumference of the fan includes magnets that cause electromagnetic energy to be experience by wiring formed in a core form on/outside of the tubular housing, in accordance with features of the present invention.
Figure 14:
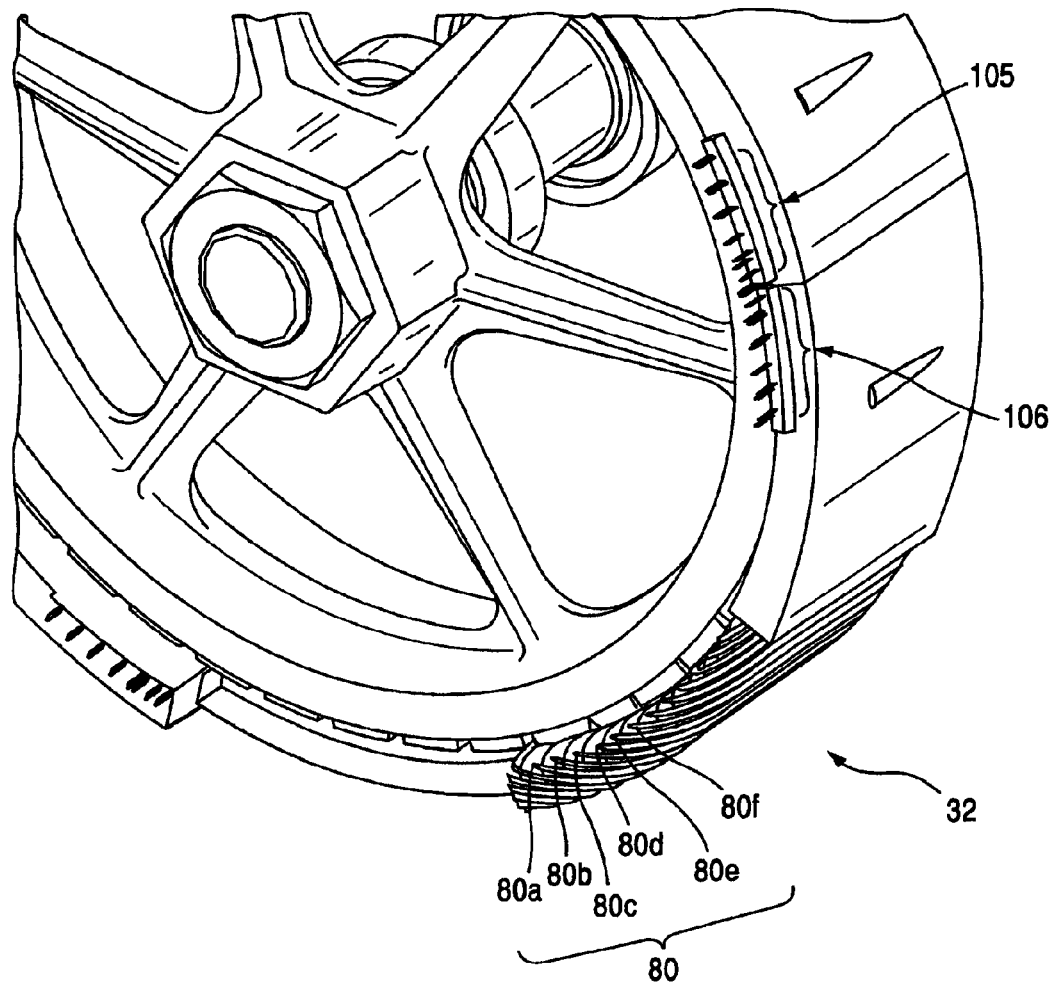
Figure 15:
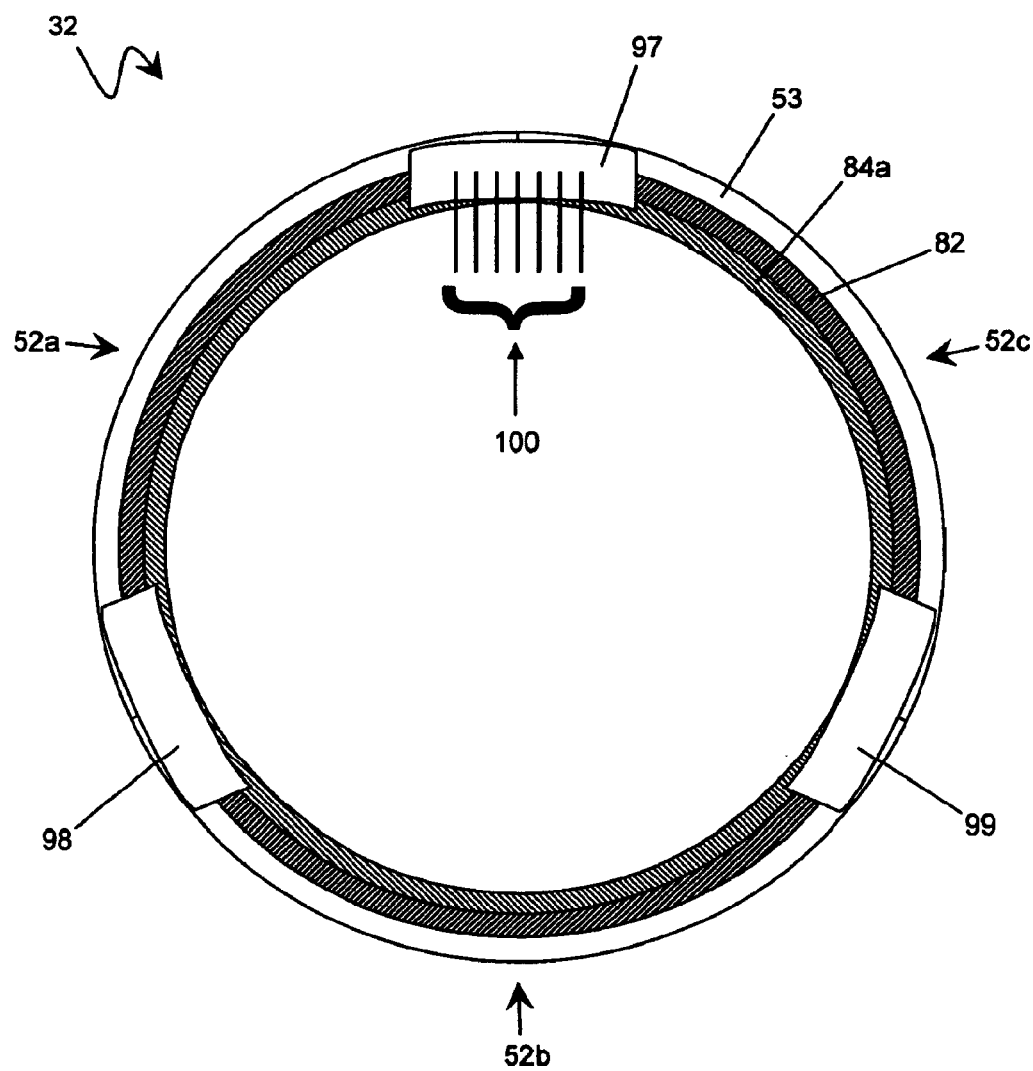

In accordance with a feature of the present invention a slotless integrated fan alternator 560 can be provided as the electrical power generating hardware for the invention described herein. Referring to FIGS. 13-15, partial views of an exemplary slotless integrated fan alternator 560 in accordance with an embodiment of the present invention are illustrated. The cutaway views of the alternator shown in FIGS. 13 and 14 include conductor coils 80 formed from a flat conductor material (e.g., copper) emplaced around a laminated or other eddy current reducing material, such as powdered iron, providing a low loss core 78, the core can be comprised of a magnetic flux conducting material, such as steel or other ferrous material. The use of a flat conductor material can maximize the compactness in spacing of the coils 80, while minimizing eddy currents and other negative effects associated with use of round cross-sectional conductor material, such as typical round profile copper wire.

The laminated or otherwise low loss core 78 and emplaced conductor coils 80 can be surrounded by a watertight molded section 53, such as a sealed plastic casing. The winding portion of the alternator 32, which includes the laminated or otherwise low loss core 78, the coils 80, and the molded section 53, can be integrated in or located within or outside the tubular housing 110 (not shown). In the embodiment shown in FIGS. 13-15, the winding portion of the alternator 32 can be divided into three sections 52a, 52b, 52c, although any suitable number of sections (including one) may be used. Advantages of the use of such sections 52a, 52b, 52c include increased ease of repair by allowing disassembly and replacement of only a portion of the winding portion of the alternator 32. In addition, emplacement of the coils 80 about the laminated or otherwise low loss core 78 is simplified, as the coils 80 may be wound separately from the core portions corresponding to the winding portion sections 52a, 52b, 52c, and then slidably or otherwise emplaced about the winding portion sections 52a, 52b, 52c via the ends of the winding portions sections 52a, 52b, 52c. Further, the sections 52a, 52b, 52c may be more easily produced by comprising smaller angle portions of the overall winding portion of the alternator 32. For example, in one embodiment, the laminations and/or other core material are stamped from flat stock, and a greater number of laminations may be most efficiently produced from the flat stock by using one third sections (or smaller) sections of the winding portion of the alternator 32. Likewise, such produced core sections and produced winding portions may more easily by shipped and stored.

The rotating portion of the alternator 96 can include a rotor portion 84 and a magnet portion 82. The rotor portion 84 includes a rim portion 84a, a hub portion 84b, and one or more fan blade shaped spokes 84c for coupling the rim portion 84a to the hub portion 84b. The fan blades 84c are an important aspect of the generator in order to facilitate its use in line within fluid streams passing through a tubular housing. The fan blades can be provided in a cupped formation in order to enhance the capture of fluid, and thereby enhance rotational movement of the rotor portion 82 as fluid passes through the rotor portion 82 and fan blades 84c The magnet portion 82 includes a plurality of magnetic elements (e.g., individual magnets or magnetized portions of magnetic material) arranged about and attached to the rim portion 84a. For example, the magnetic elements may include a plurality of individual magnets abuttably attached (e.g., such as by an adhesive) to the rim portion 84a, each of the individual magnets being oriented 180 degrees in its polar direction relative to each pair of adjacent individual magnets, such that alternating pairs of adjacent north and south magnet poles are formed, and fields are produced by such magnets, each field having an orientation 180 degrees opposite the field produced by each adjacent magnet. To increase the magnetic flux transmitted via the magnetic elements, such as relative to air, the core 78 is typically includes a magnetic flux conducting material, such as iron, steel, or other ferrous material, and the rim portion 84a of the rotor portion 84 also includes a magnetic flux conducting material, such as iron, steel, or other ferrous material. A cone 95 can be provided and if provided is oriented facing incoming fluid flow within the tubular housing in order to compress and speed up the flow of fluid as it impacts the fan blades 84C. At the backside of the rotor portion 84, opposite the cone 95, an axle and hub assembly (not shown) can be provided to securely orient and mount the rotor portion within the tubular housing 110 and in alignment with the winding portion 32 of the alternator. Such an assembly, however, is well known in the mechanical art.

A hub associated with the rotor portion 84 can be attached to an axle. The axle can include one or more features such as bearings or bushings, for minimally frictionally engaging a mounting, such as an opening in an alternator housing. In operation, the magnet portion 82 is thus able to rotatably move via the rotor portion 84 and the driven axle 95 relative to the fixably maintained winding portion as fluid passes over and through the fan blades 84C. In wet applications, it is preferred that the hub, bearing and bushings section of the rotor be sealed.

The coils 80 of the exemplary embodiment shown in FIGS. 13 and 13 are connected so as to form six sets of windings 80a, 80b, 80c, 80d, 80e, 80f, which abut one another and repeat in sequence about the circumference of the laminated or otherwise low loss core 78. As shown most clearly in FIG. 14, each of the sets of windings 80a, 80b, 80c, 80d, 80e, 80f is connected to the next corresponding set of windings along the windings portion of the alternator 32 at one end. In one embodiment, successive pairs of each of the sets of windings are connected at opposite ends, such that the each successive coil portion has opposite polarity to the previous connected coil portion. Among other advantages, this approach allows multiple connections and increased redundancy to be obtained, thereby providing the necessary redundancy for the redundant stall control. Assembly may be eased and performance may be improved by ensuring that each of the sets of windings 80a, 80b, 80c, 80d, 80e, 80f are very similar or essentially identical.

FIG. 15 shows a partial diagram of the alternator 32, which includes the windings portion 53, the magnet section 82, and the rim 84a of the hub. Upon assembly, each of the three winding portion sections 52a, 52b, 52c of the alternator 32 is connected at its ends to the adjacent two sections. Six wire ends (see, e.g., wiring end groups 105, 106, as shown in FIG. 13), one for each of the six sets of windings 80a, 80b, 80c, 80d, 80e, 80f, as shown in FIGS. 13 and 14, extend from each end of each of the three winding portion sections 53a, 53b, and 53c. Each of the six wire ends extending from each abutting pair of winding portion sections 53a, 53b, 53c is coupled to the six wire ends extending from the adjacent winding portion section. The coupling may occur, for example, via printed circuit boards or other coupling components 97, 98, 99. Each of the laminated or otherwise low loss cores 78 of each of the winding portion sections 52a, 52b, 52c similarly abut one another.

Six continuous windings can be therefore formed by the coupled corresponding windings in each of the winding portion sections 53a, 53b, 53c, shown in FIGS. 13-15, with a first end of each of the six continuous windings terminating at one of the coupling components 97, which includes a lead corresponding to each of the first ends of the six continuous windings.

Each of the second ends of the six continuous windings are coupled together via the coupling component 97 and coupled to a seventh lead, such that seven leads 100 extend from the coupling component 97, the seventh lead corresponding to the center point of the six continuous windings. Alternators generate electricity by the same principle as DC generators, namely, when the magnetic field around a conductor changes, a current is induced in the conductor. Typically, a rotating magnet called the rotor turns within a stationary set of conductors wound in coils on an iron core, called the stator. The field cuts across the conductors, generating an electrical current, as the mechanical input causes the rotor to turn. The rotor magnetic field can be produced by induction (in a "brushless" alternator), by permanent magnets (in very small machines), or by a rotor winding energized with direct current through slip rings and brushes. The rotor magnetic field may even be provided by a stationary field winding, with moving poles in the rotor.

Figure 16:
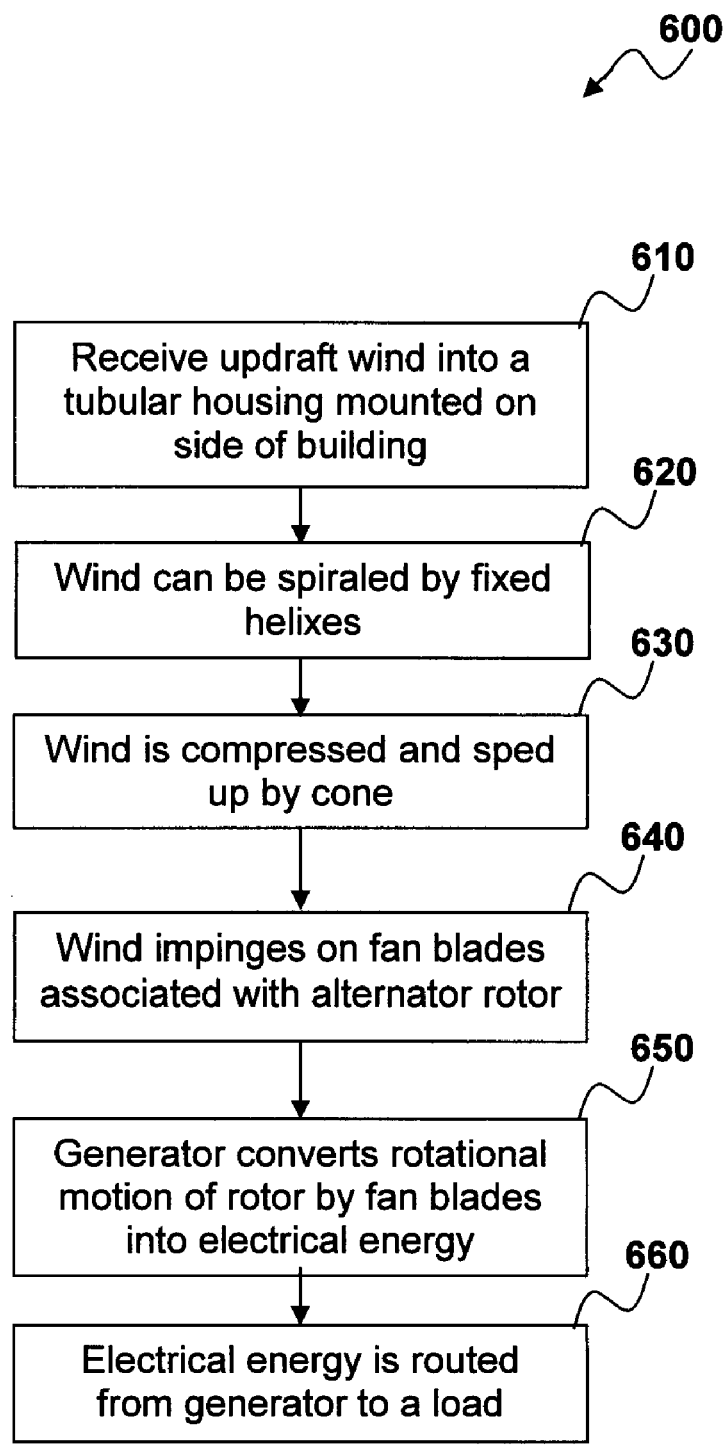
FIG. 16 illustrates a high level flow chart of operations depicting a wind driven electrical power generating method, which can be implemented in accordance with a preferred embodiment.

FIG. 16 illustrates a high level flow chart 600 of a fluid driven electrical power generation method, which can be implemented in accordance with a preferred embodiment. Updraft wind is received into a tubular as shown in Block 610. As depicted at Block 620, updraft wind (e.g., air flowing) within the housing becomes spiraled by fixed helixes, formed on the inner surface of the tubular housing. The spiraled air flow is then compressed and speeds up by a cone as shown in Block 630. Then as shown in Block 640, spiraled air impinges on fan blades associated with an alternator rotor. Then as shown in Block 650, an alternator converts rotational motion of the rotor by fan blades into electrical energy. Then as shown in block 660, electrical energy is routed from the alternator to a load.

Figure 17:
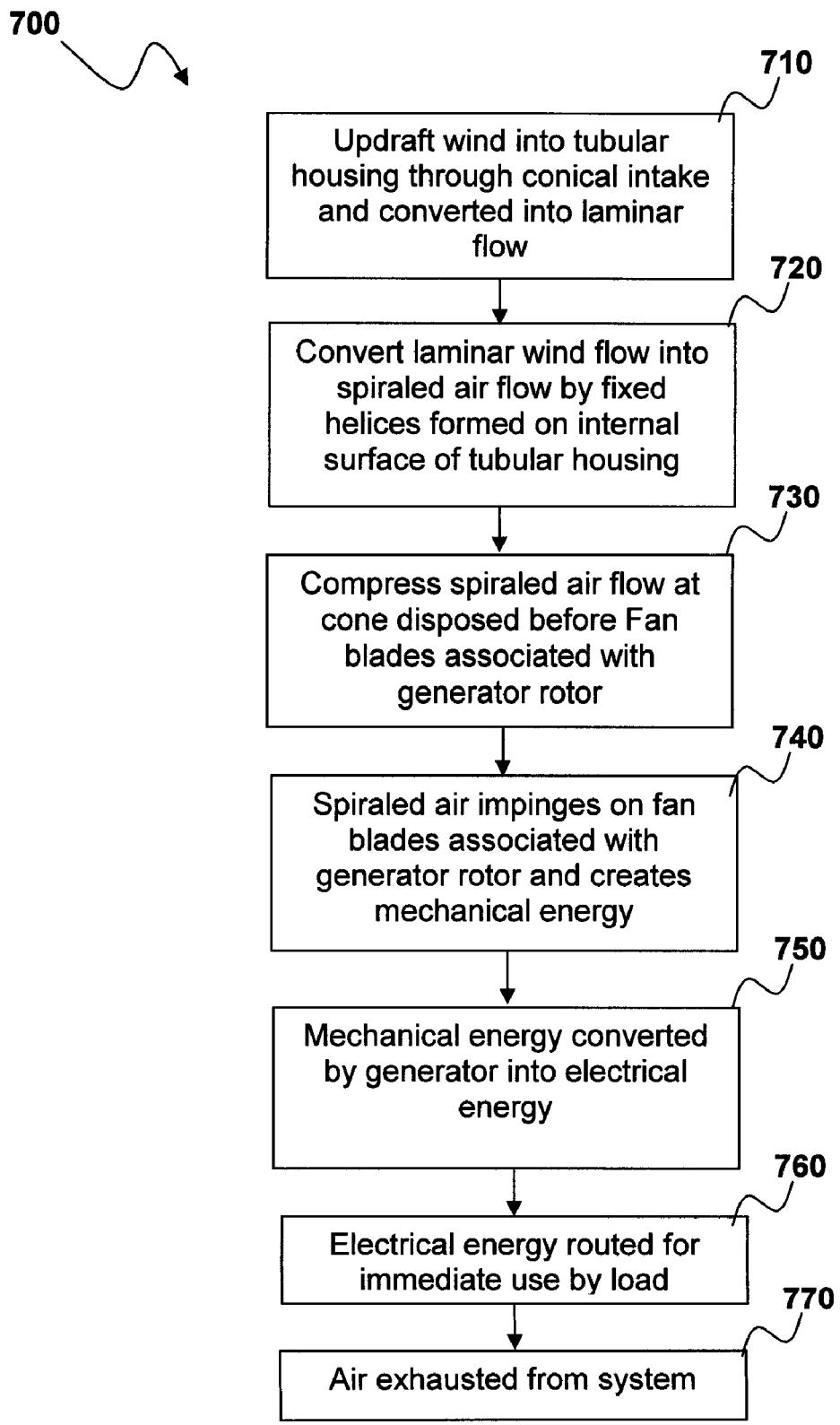
FIG. 17 illustrates a high level flow chart of operations depicting a wind driven electrical power generating method, which can be implemented in accordance with an alternative embodiment.

FIG. 17 illustrates a high level flow chart 700 of a wind driven electrical power generation method, which can be implemented in accordance with a preferred embodiment. As shown in Block 710, air flow is taken into a tubular housing through a conical intake and then converted into a laminar flow. Then as shown at Block 720, laminar air flow is converted into spiraled fluid flow with fixed helices formed on the internal surface of the tubular housing. Then as shown in block 730, spiraled air flow is compressed with a cone disposed before fan blades associated with the alternator rotor. The spiraled air impinges on the fan blades associated with alternator rotor and creates mechanical energy as shown in block 740. The mechanical energy is then converted from the fan rotor into electrical energy by a coil portion of the alternator, as shown in Block 750. Then as shown in Block 760, electrical energy is routed for immediate use by a load. Finally, as shown in block 770, air is exhausted from the system.

The wind driven electric power generator of the present invention can be compact and easy to mount. The present system can be designed for harsh climates, built simply and ruggedly to quietly last. The system design can incorporate a cowling as an air intake and internal helical vanes to help direct the amount of air flow into the chamber to capture more wind and produce more energy, especially in low wind speeds which lends itself to more efficient power generation utilizing renewable energy. Various system configurations can be achieved given the present teaching by incorporating the most advanced technology in the industry and providing highly reliable power systems that can integrate state-of-the-art off the shelf micro-processor regulator for more accurate charging, more power, lower startup speed and quieter operation, and small wind turbine generators. For example, a light weight system can be manufactured using an Aluminum cast body and carbon matrix rotor blades. A system can be designed to start up a low wind speed (e.g., starting at 7 mph), run efficiently (e.g., 100 watts at 18 mph, 200 watts at 22 mph, 400 watts at 28), and be resilient to harsh conditions (e.g., designed to govern in high winds and auto-brake one demand or automatically).

Generated electrical power can be routed via electrical connections from the generator for direct storage in and then for later from batteries. Conditioning can be provided to generated power if necessary using conditioning circuits known in the art (e.g., filtering circuits). The size of the present system is scalable to meet delivery requirements.

Temperature of the system may need to be controlled depending on the climate it operates within. For example, during winter or in colder climates, an internal thermostatically controlled heating device may be incorporated into the system to prevent freezing of the unit's moving parts.

The enclosure tube (i.e., the general housing) can be designed such that its diameter can be calculated to fit the desired electrical output and must be matched with each integral part both internal as well as external. This calculation can also include allowance for creation of a pressure effect between and/or over the generator and its mounting assembly to maximize the affect of the available wind. The enclosure can be made of a tough light weight metal or a composite that will be able to withstand harsh environments while meeting the highest of standards.

Additional features of the system are that the generator can be placed substantially within the housing, which can protect it from external elements, and the fan can be connected to the generator at the end of the system opposite incoming wind with respect to the generator and tubing. A cone can be located at the front of the generator facing incoming air/wind to cause the wind/air to flow directly onto the blades and not encounter a flat edge typically associated with the back of a generator. Pressure caused between the tubing and the cone/generator can be forced onto the generator fan blade assembly and outward where it exits to the rear of the unit. The back of the generator can be fitted with a cone as well to further direct the air on to the cupped fan blade. The rear funnel also plays a critical part as the blade can be placed in such a way to provide additional thrust to the fan blade by the clearance of the blade and funnel.

An electronic starting circuit can be provided in order to facilitate initial starting of the generator from periods when the generator is idle (e.g., no rotation due to lack of wind). The electronic starting system can provide an initial release of electrical energy to the windings in the generator to thereby reduce the amount of wind required to spin-up or start rotation of the generator. For example, a capacitor circuit has been coupled into electrical systems such as heating and air conditioning units to provide initial startup. Generators are known to have some resistance under a load. With a large initial starting charge drawn from the circuit, the generator can be spun up to a speed where at the wind can take over and continue rotation of the generator at minimum speeds via the fan blades.

It can also be appreciated that a various alternators can be used as the generator for the present invention. Prior art alternators/generators typically contain slots of steel that hold a number of copper windings, which, in connection with the use of permanent magnets, convert the energy of a passing fluid into electrical output. In the prior art designs, the slots often tend to vibrate when in operation. The vibration can produce unacceptable noise and a cogging torque that prevents the fluid turbine from starting up or interferes with startup in lower fluid speeds, which is typically experience by wind turbines. Additionally, prior art alternators typically have low stall torque and high manufacturing costs. A new alternator design is needed that eliminates unnecessary vibrations, increases the stall torque, and decreases manufacturing costs.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A wind driven electrical power generating system, comprising:
    at least one tubular housing mounted to a side of a building, said at least one tubular housing and having an inner surface, outer surface, a first end and a second end, the first end adapted to receive incoming updraft wind flowing along then side of the building and directing it through the tubular housing, and the second end providing an exhaust for wind to exit from the tubular housing; and
    an electrical alternator mounted within the tubular housing before the exhaust, the electrical alternator further including fan rotor assembling including fan blades adapted to rotate with the passage of fluid through the housing.

2. The wind driven electrical power generating system of claim 1, further comprising at least one fixed helical vane formed on the inner surfaces of the tubular housing in a spiral and adapted to cause fluid flowing through the housing to become spiraled for optimum effect on the fan blades.

3. The wind driven electrical power generating system of claim 1, further comprising a cowling located at the first end and adapted to capture wind and direct it into a tubular housing, the at least one fixed helical vane further direct the captured wind into a spiraled air flow and focus the fluid directly onto the fan blades located near an exhaust of the system causing the alternator to generate electrical energy.

4. The wind driven electrical power generating system of claim 1, further comprising a cone mounted at a front surface of at least one of the alternator and fan facing air passing through the tubular housing, wherein as wind passes over the cone it is compressed between the cone and housing resulting in increased pressure and velocity of the wind, thereby increasing rotational speed of the fan blades and alternator as compressed air passes through the fan blades and exits the exhaust.

5. The wind driven electrical power generating system of claim 1, further comprising a architectural housing mounted at the at least one tubular housing and including a screen comprised of at least one of a grill, netting, screen, wire fence material, wherein said screen enables wind and air to flow through the at least one tubular housing and prevents birds from nesting in the at least one tubular housing.

6. The wind driven electrical power generating system of claim 1, further comprising a conical flange formed at the second end of the unit, said conical flange adapted to protect the fan blades and enables fluid to escape from the unit without interruption from fluid moving along the outer surface of the housing.

7. The wind driven electrical power generating system of claim 1, wherein said alternator further comprises a slotless winding portion, including windings encompassing a core comprising magnetic flux conducting material; a fan rotor portion having a rim formed on the outer diameter of integrated fan blades, and a plurality of magnetic elements attached to the rim, wherein the rim comprises a magnetic flux conducting material and wherein the slotless winding portion is fixed to the tubular housing and the fan rotor portion is rotatably moveable relative to the slotless winding portion as a fluid passes through the tubular housing and said fan rotor.

8. The device of claim 7, wherein said fluid driven electric power generation system is incorporated as part of a system to generate electrical power for a load associated with at least one of: a tall commercial building, a large warehouse, a wall, a large vertical man-made structure, to capture wind.

9. A wind driven electrical power generating system, comprising:
a vertical, man-made structure having at least one side facing prevailing wind and including more than one tubular housings mounted on the at least one side, each of said more than one tubular housings having an inner surface, outer surface, a first end and a second end, the first end including a cowling adapted to capture wind and directing it into the tubular housing, and the second end forming an exhaust for wind to exit the more than one tubular housing;
at least one fixed helical vane formed in a spiral on the inner surface of each of the more than one tubular housing;
an alternator in each of the more than one tubular housing, said alternator further comprising a slotless winding portion including windings encompassing a core comprising magnetic flux conducting material; a fan rotor portion having a rim formed on the outer diameter of integrated fan blades, and a plurality of magnetic elements attached to the rim, wherein the rim comprises a magnetic flux conducting material and wherein the slotless winding portion is fixed to the tubular housing and the fan rotor portion is rotatably moveable relative to the slotless winding portion as a fluid passes through the tubular housing and said fan rotor; and
a generator cone mounted in each of the more than one tubular housing at a front surface of the fan rotor portion facing wind as it passes through the more than one tubular housing;
wherein the cowling captures wind and directs it into a tubular housing, the at least one fixed helical vane further directs the captured wind into a spiraled air flow that passes over the generator cone and is compression between the generator cone and housing resulting in increased pressure and velocity of the spiraled air flow onto the fan rotor thereby increasing rotational speed of the fan blades as compressed fluid passes through the fan rotor and exits the tubular housing.

10. A man-made vertical structure including at least one side facing prevailing winds, comprising:
at least one updraft wind driven electrical power generating system mounted to the at least one side, said at least one updraft wind driven electrical power generating system further comprising:
at least one tubular housing mounted to a side of a building, said at least one tubular housing and having an inner surface, outer surface, a first end and a second end, the first end adapted to receive incoming updraft wind flowing along then side of the building and directing it through the tubular housing, and the second end providing an exhaust for updraft wind to exit from the tubular housing;
an electrical alternator mounted within the tubular housing before the exhaust, the electrical alternator further including fan rotor assembling including fan blades adapted to rotate with the passage of updraft wind through the housing; and
at least one fixed helical vane formed on the inner surfaces of the tubular housing in a spiral and adapted to cause updraft wind flowing through the housing to become spiraled for optimum effect on the fan blades.

11. The man-made vertical structure including at least one side facing prevailing winds of claim 10, said at least one wind driven electrical power generating system further comprising a cowling located at the first end and adapted to capture updraft wind and direct it into a tubular housing, the at least one fixed helical vane further direct the captured updraft wind into a spiraled air flow and focus the fluid directly onto the fan blades located near an exhaust of the system causing the alternator to generate electrical energy.

12. The man-made vertical structure including at least one side facing prevailing winds of claim 10, further comprising a cone mounted at a front surface of at least one of the alternator and fan facing air passing through the tubular housing, wherein as updraft wind passes over the cone it is compressed between the cone and housing resulting in increased pressure and velocity of the wind, thereby increasing rotational speed of the fan blades and alternator as compressed air passes through the fan blades and exits the exhaust.

13. The man-made vertical structure including at least one side facing prevailing winds of claim 10, further comprising a architectural housing mounted at the at least one tubular housing and including a screen comprised of at least one of a grill, netting, screen, wire fence material, wherein said screen enables updraft wind to flow through the at least one tubular housing and prevents birds from nesting in the at least one tubular housing.

14. The man-made vertical structure including at least one side facing prevailing winds of claim 10, further comprising a conical flange formed at the second end of the unit, said conical flange adapted to protect the fan blades and enables updraft wind to escape from the unit without interruption from fluid moving along the outer surface of the housing.

15. The man-made vertical structure including at least one side facing prevailing winds of claim 10, wherein said alternator further comprises a slotless winding portion, including windings encompassing a core comprising magnetic flux conducting material; a fan rotor portion having a rim formed on the outer diameter of integrated fan blades, and a plurality of magnetic elements attached to the rim, wherein the rim comprises a magnetic flux conducting material and wherein the slotless winding portion is fixed to the tubular housing and the fan rotor portion is rotatably moveable relative to the slotless winding portion as a fluid passes through the tubular housing and said fan rotor.

16. The man-made vertical structure including at least one side facing prevailing winds of claim 10, wherein said updraft wind driven electric power generation system is incorporated as part of a system to generate electrical power for a load associated with at least one of: a tall commercial building, a large warehouse, a wall, a large vertical man-made structure, to capture updraft wind.

\* \* \* \* \*

UNITED STATES PATENT AND TRADEMARK OFFICE
CERTIFICATE OF CORRECTION

PATENT NO. : 8,362,635 B2  Page 1 of 1
APPLICATION NO. : 12/632699
DATED : January 29, 2013
INVENTOR(S) : Luis M. Ortiz, Anthony Michael Baca and Donald Wichers It is certified that error appears in the above-identified patent and that said Letters Patent is hereby corrected as shown below:

1) Column 12 Claim 1, line 56, please delete "and";

2) Column 12 Claim 1, line 59, please delete "then" and insert therefore --the--;

3) Column 12 Claim 1, line 65, please delete "assembling" and insert therefore --assembly--;

4) Column 13 Claim 5, line 23, please delete "a" and insert therefore --an--;

5) Column 14 Claim 9, line 17, please delete "compression" and insert therefore --compressed--;

6) Column 14 Claim 10, line 31, please delete "and";

7) Column 14 Claim 10, line 33, please delete "then" and insert therefore --the--;

8) Column 14 Claim 10, line 39, please delete "assembling" and insert therefore --assembly--;

9) Column 14 Claim 13, line 66, please delete "a" and insert therefore --an--.

Signed and Sealed this
Nineteenth Day of March, 2013

Teresa Stanek Rea
*Acting Director of the United States Patent and Trademark Office*